US008286683B2

(12) United States Patent
Jönsson

(10) Patent No.: US 8,286,683 B2
(45) Date of Patent: Oct. 16, 2012

(54) DEVICE FOR AUTOMATICALLY SEPARATING THE TIRE AND THE RIM IN A VEHICLE WHEEL

(75) Inventor: Lars Jönsson, Skepplanda (SE)

(73) Assignee: Tyre Save Sweden AB (SE)

( * ) Notice: Subject to any disclaimer, the term of this patent is extended or adjusted under 35 U.S.C. 154(b) by 292 days.

(21) Appl. No.: 12/741,015

(22) PCT Filed: Nov. 7, 2008

(86) PCT No.: PCT/SE2008/051272
§ 371 (c)(1),
(2), (4) Date: Jun. 24, 2010

(87) PCT Pub. No.: WO2009/061277
PCT Pub. Date: May 14, 2009

(65) Prior Publication Data
US 2010/0307693 A1    Dec. 9, 2010

(30) Foreign Application Priority Data
Nov. 8, 2007   (SE) ...................................... 0702473

(51) Int. Cl.
*B60C 25/05* (2006.01)
(52) U.S. Cl. ....................................... 157/1.21; 100/232

(58) Field of Classification Search ................. 157/1.17, 157/1.21; 100/232
See application file for complete search history.

(56) References Cited

U.S. PATENT DOCUMENTS

| 4,080,887 A | 3/1978 | Larsen |
| 4,083,394 A * | 4/1978 | Heikkinen et al. ........... 157/1.21 |
| 4,804,031 A * | 2/1989 | Rouse et al. ................. 157/1.21 |
| 5,415,218 A | 5/1995 | Shibazaki |
| 5,495,882 A * | 3/1996 | Trant .......................... 157/1.21 |
| 5,678,621 A | 10/1997 | Trant |

FOREIGN PATENT DOCUMENTS

| WO | WO-9939929 A1 | 8/1999 |
| WO | WO-03095246 A1 | 11/2003 |

* cited by examiner

*Primary Examiner* — David B Thomas
(74) *Attorney, Agent, or Firm* — Schwegman Lundberg & Woessner, P.A.

(57) ABSTRACT

Device for automatically separating the tire and the rim in a vehicle wheel. The feed-in device feeds in vehicle wheels and a press-in device is located in an inactive position at a distance from the rim edge and is shifted to an active position. Press-in members are adjusted in the direction of the rim in order to press in the rim edge, whereafter the rim can be pressed out. The press-in device with a number of press-in elements forms a unit, which is movably suspended from a frame in which the wheel is placed in position to separate the tire and the rim. Feed-out devices feed out the separated rims to a first collection point and the separated tires to a second collection point.

9 Claims, 8 Drawing Sheets

DEVICE FOR AUTOMATICALLY SEPARATING THE TIRE AND THE RIM IN A VEHICLE WHEEL

RELATED APPLICATIONS

This application is a U.S. National Stage Filing under 35 U.S.C. 371 from International Patent Application Serial No. PCT/SE2008/051272, filed Nov. 7, 2008, and published on May 14, 2009 as WO 2009/061277 A1, which claims the priority benefit of Sweden Application Serial No. 0702473-0, filed Nov. 8, 2007, the contents of which applications and publication are incorporated herein by reference in their entirety.

TECHNICAL FIELD

The invention relates to a device for automatically separating the tire and the rim in a vehicle wheel, according to the preamble to patent claim 1.

BACKGROUND ART

Through patent publications WO 99/39929 and WO 03/095246, it is previously known to separate the tire and the rim in a vehicle wheel by pressing in one rim edge in the radial direction by means of a number of press-in elements. These are designed to deform one rim edge such that the tire can be removed in a substantially axial direction.

DISCLOSURE OF INVENTION

The object of the present invention is to provide a device for automatically separating the tire and the rim in a rational manner, which device allows large volumes to be handled with a minimum of breaks in operation.

Said object is achieved by means of a device for automatically separating the tire and the rim according to the characterizing part of the following patent claim 1.

BRIEF DESCRIPTION OF DRAWINGS

The invention will be described in greater detail below with an illustrative embodiment with reference to the appended drawings, in which FIG. 9 shows schematically a wheel after one rim edge has been pressed in.

MODE(S) FOR CARRYING OUT THE INVENTION

Figure 1:
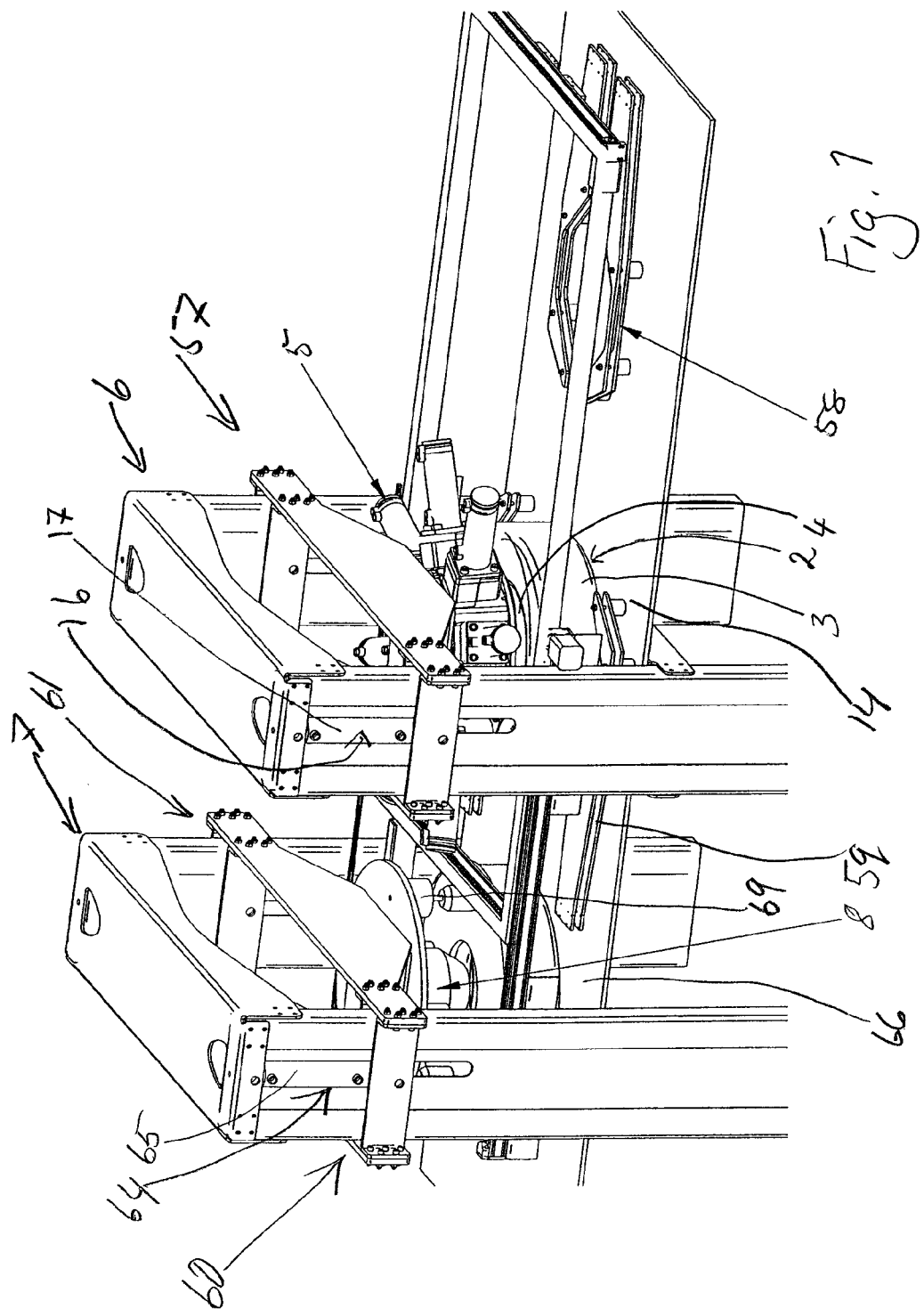
FIGS. 1-4 show with one example a perspective view, a side view, a top view and an end view of an inventive device for separating the tire and the rim.
Figure 2:
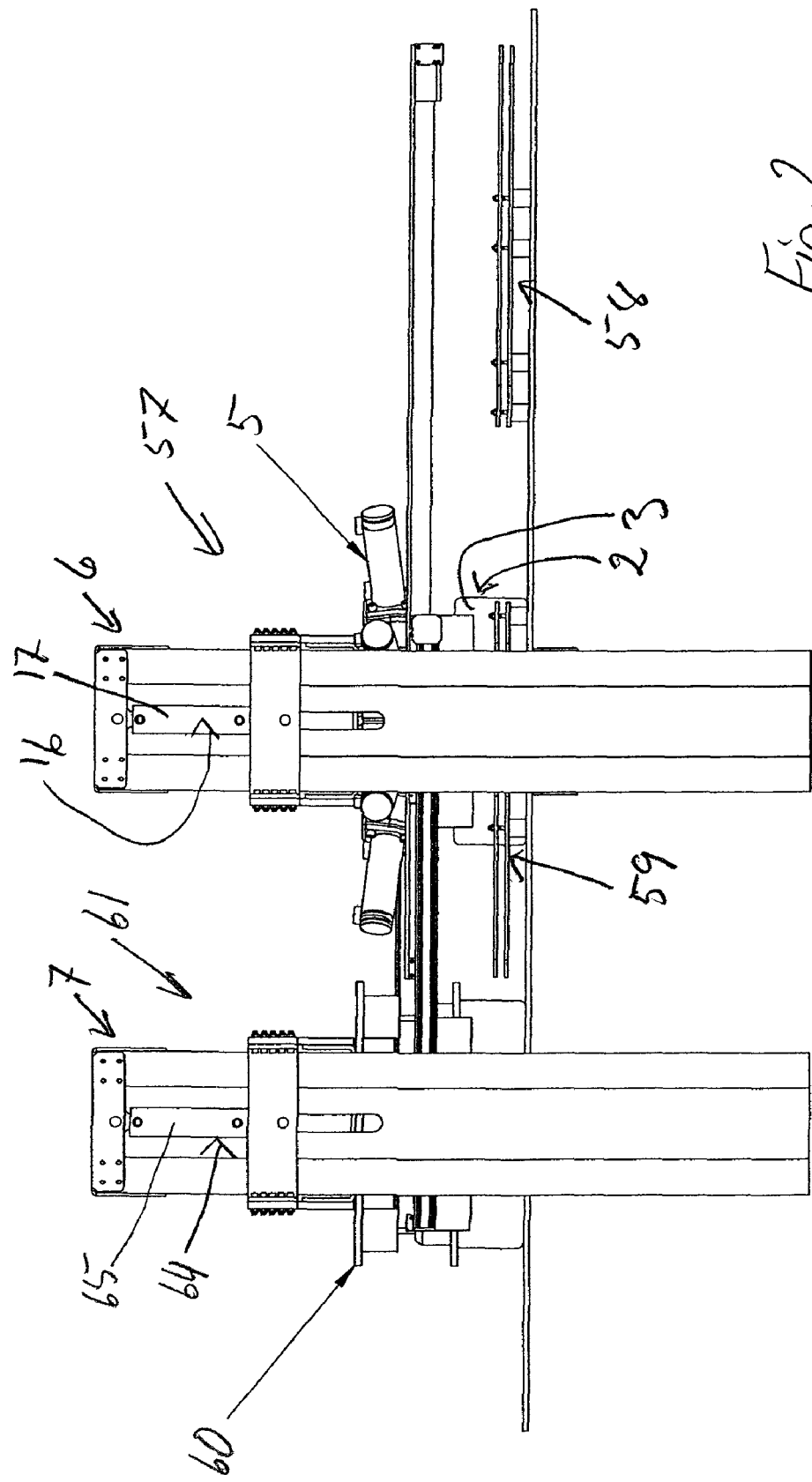
Figure 3:
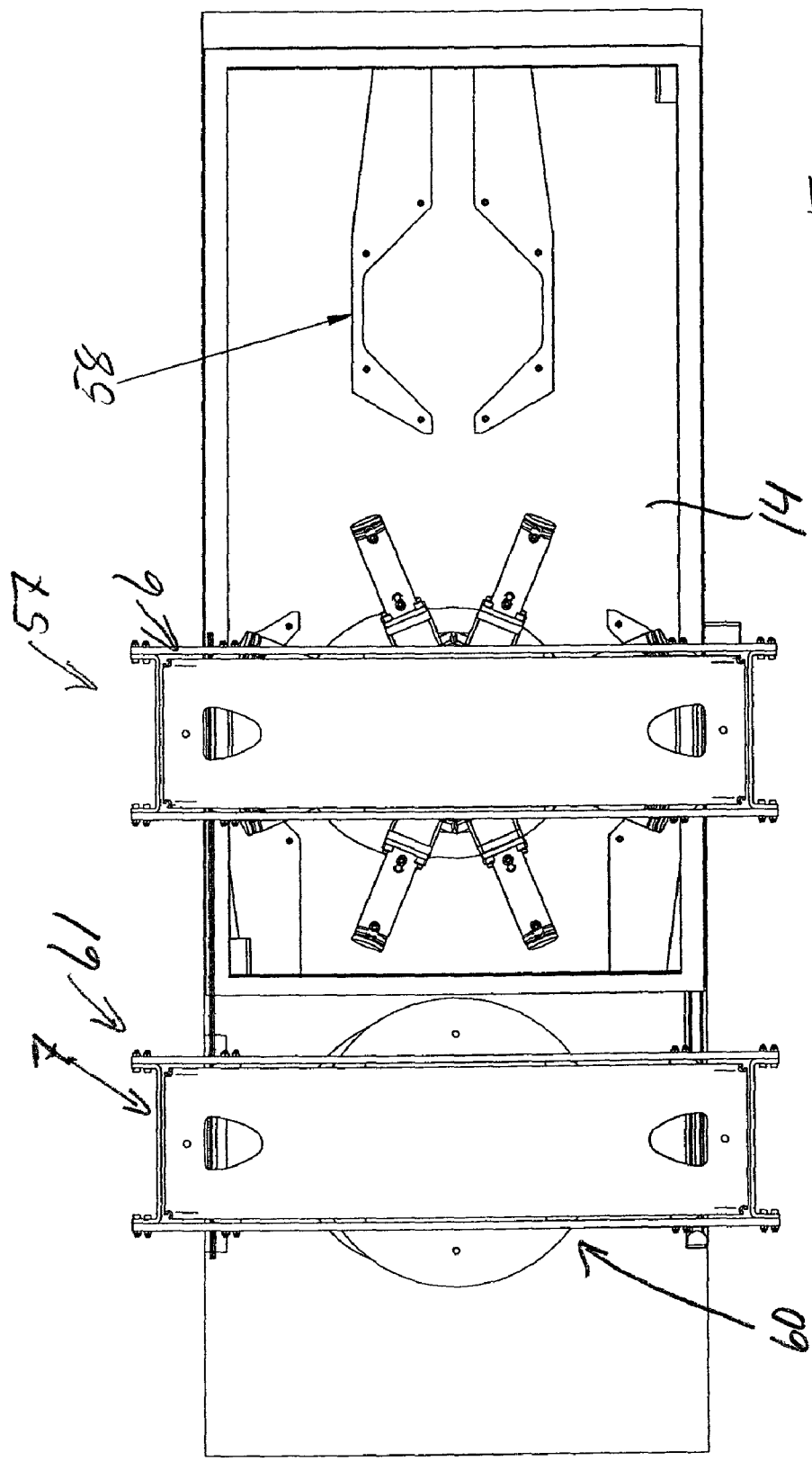
Figure 4:
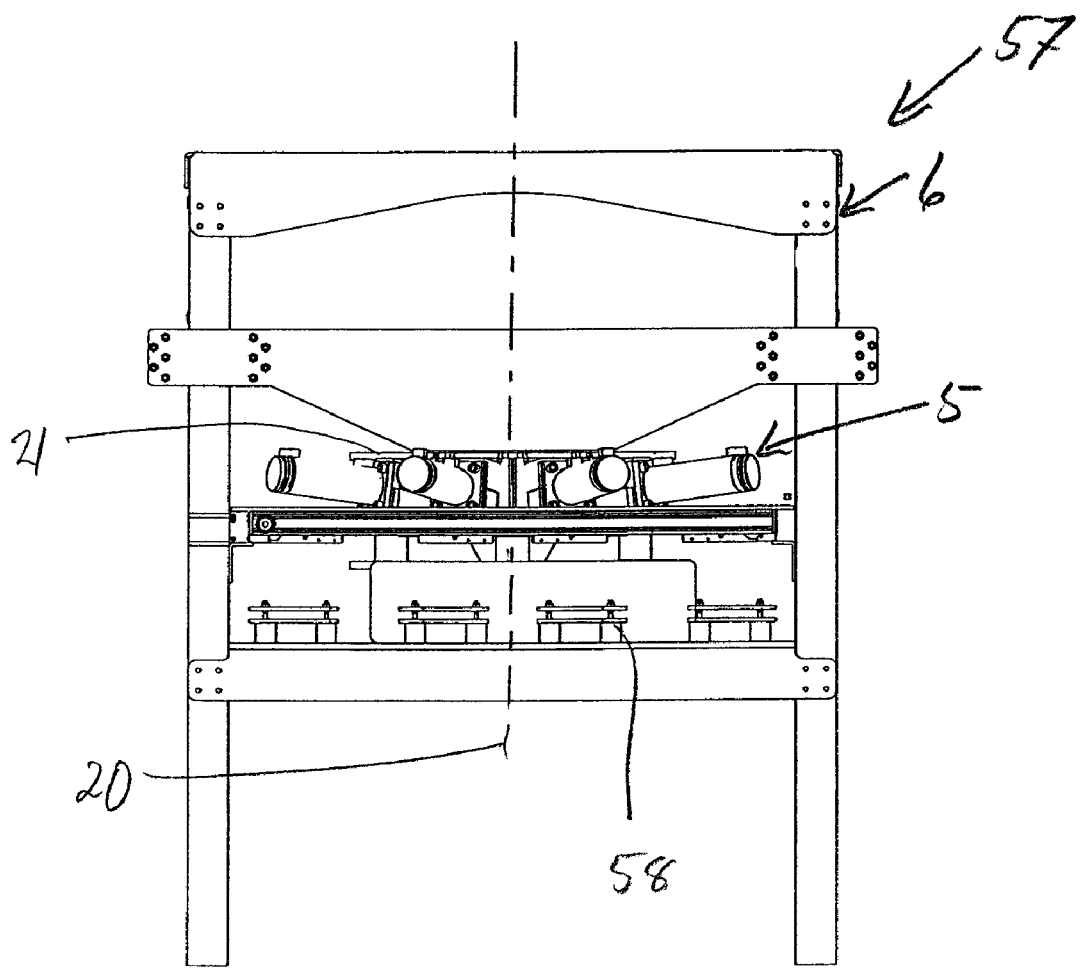

With reference first to FIG. 1-4, which show the inventive separating device in one embodiment in its entirety, the main structure thereof shall be described. The device consists of a feed device 1 for vehicle wheels 2 which are to be recovered through separation of the tire 3 and the rim 4. The feed device 1 expediently comprises a conveyor, for example in the form of a conveyor track for the forward transport of vehicle wheels which have been loaded on the track to allow the wheels to be fed to a defined position for separation of the tire and the rim. The conveyor track can consist of a belt or rollers, which carries/carry the wheels forward to a rim press-in device 5. More precisely, the track is terminated in front of the rim press-in device and is there replaced by a feeder for one wheel at a time, for example in the form of a shuttle car for feeding the wheels over the last bit through to the correct position in the rim press-in device 5. The shuttle car moves horizontally to and fro on a table in the form of a plate, in order to fetch wheels one at a time.

The tire-rim separating device is supported by frames 6, 7, which in the example are realized as portal frames which can support parts of the feed-in device 1. Alternatively, the parts which support the first conveyor track can be supported by a fully free-standing frame to facilitate transports of the device.

In the shown example, the separating device is divided into two stations, a first station, which is supported by the first portal frame and forms the rim press-in device 5, and a second station, which is supported by the second portal frame 7 and forms a rim press-out device 8, described in greater detail below, the feed device 1 extending through both stations. A second shuttle car 9 is designed to fetch a wheel 2 one at a time and feed these wheels from the first station to the second station and then onward for the collection of separated tires in, for example, a container, pressed-out rims being collected separately.

The frame 6 supports a platform 14, which can be integrated with the feed table and supports each fed wheel 2, placed in a position on the platform in the first station. The wheel 2 is here centered beneath the press-in device 5.

The first station of the separating device incorporates a power device, which is anchored in the frame 6, expediently high up in this, and in the shown example has two hydraulic piston cylinders, the cylinder part 17 of which, in the example, is fixedly anchored high up in the frame and whose 18 of which supports the rim press-in device 5, or vice versa. The press-in device 5 constitutes the most central part of the present invention and its structure and working shall now be explained in greater detail with reference to all the figures. The rim press-in device 5 is constructed as a single entity having a rig 19 or bell, which is substantially cylindrical or polygonal and is designed to be shifted by the power device between a set-aside, passive, in this case upper, passive standby position, see FIGS. 1-4, and an advanced, active, in this case lower press-in position axis of symmetry 20, in the example a vertical axis, see FIG. 1. This motion is therefore produced by the bell 19 being suspended from the power device 16, in the example from its piston rod 18, which in the example is, at its lower end 21 a bridge 9, which latter is movable in the frame by means of the power device. In respect of said bridge, is fixed in a top plate 22 on the top side of the rig.

Figure 5:
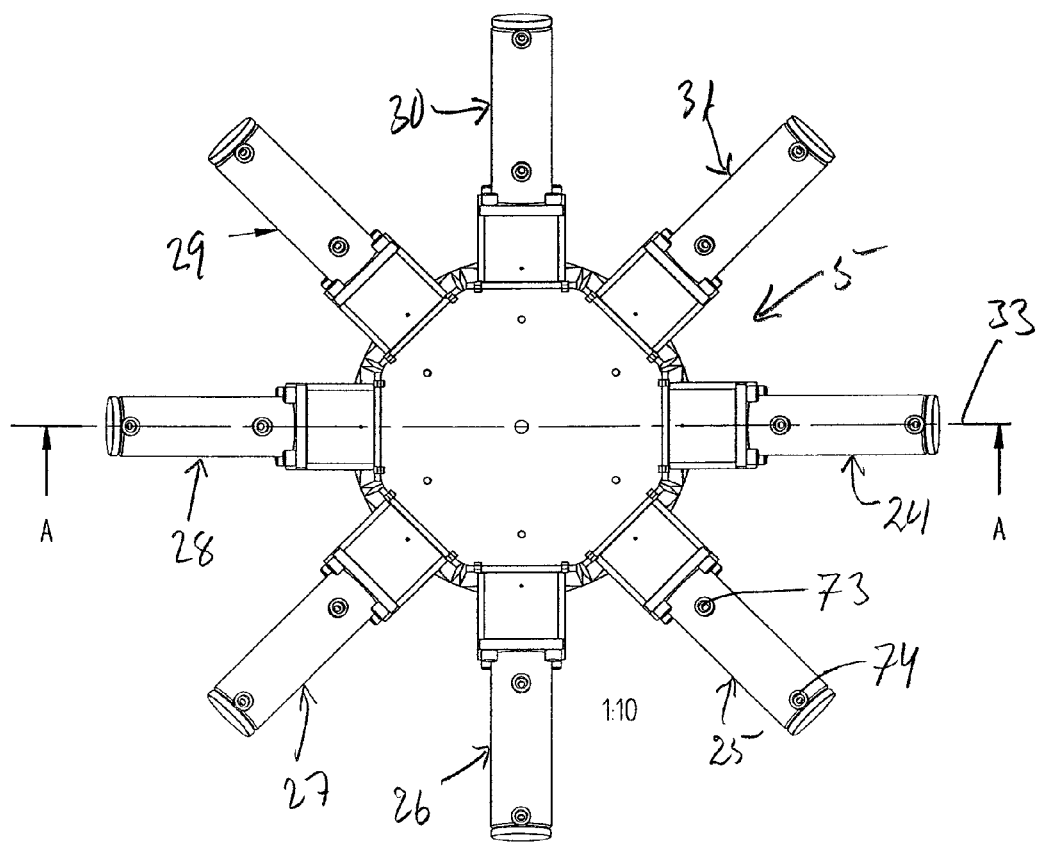
FIG. 5 shows with a top view a rim press-in device forming part of the separating device.
Figure 6:
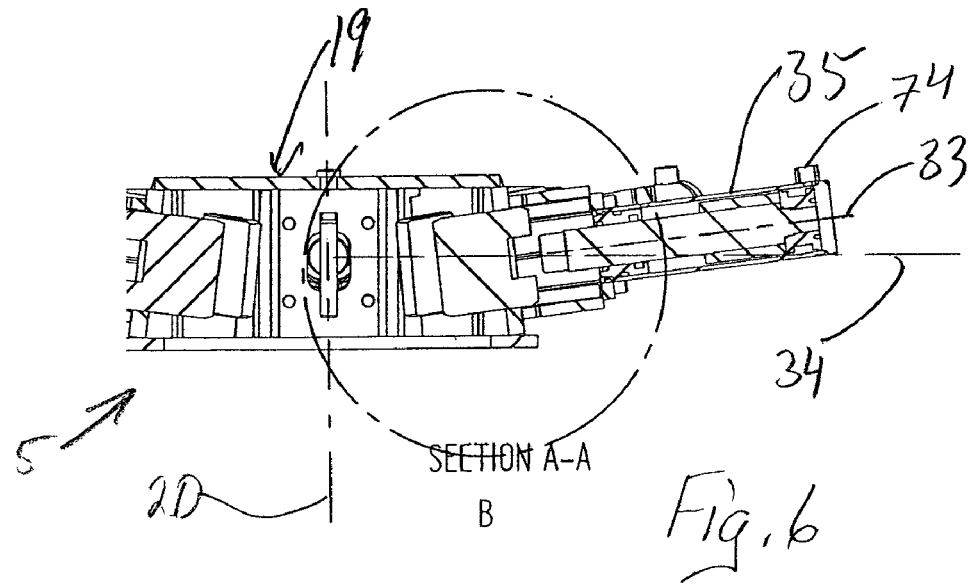
FIG. 6 is a vertical part-section through the press-in device in its activated, inner press-in position.
Figure 7:
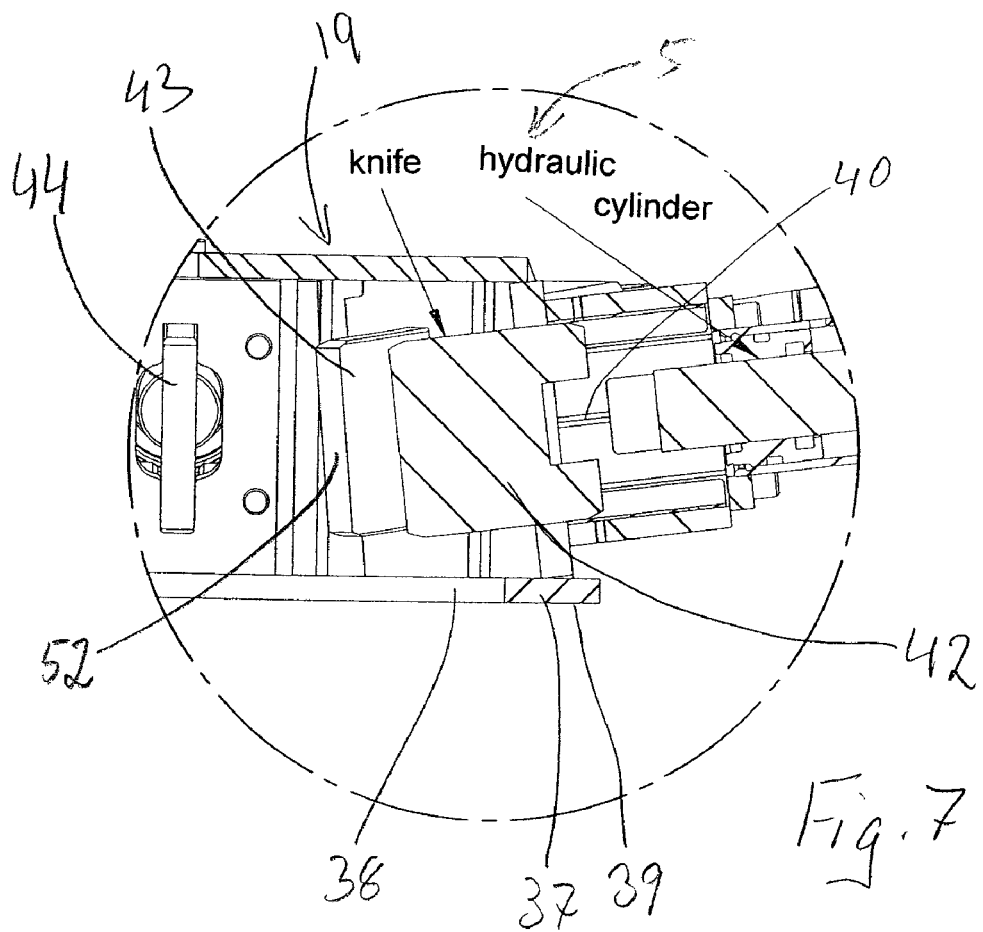
FIG. 7 shows an enlarged part-section through the inventive press-in device in its activated press-in position.
Figure 8:
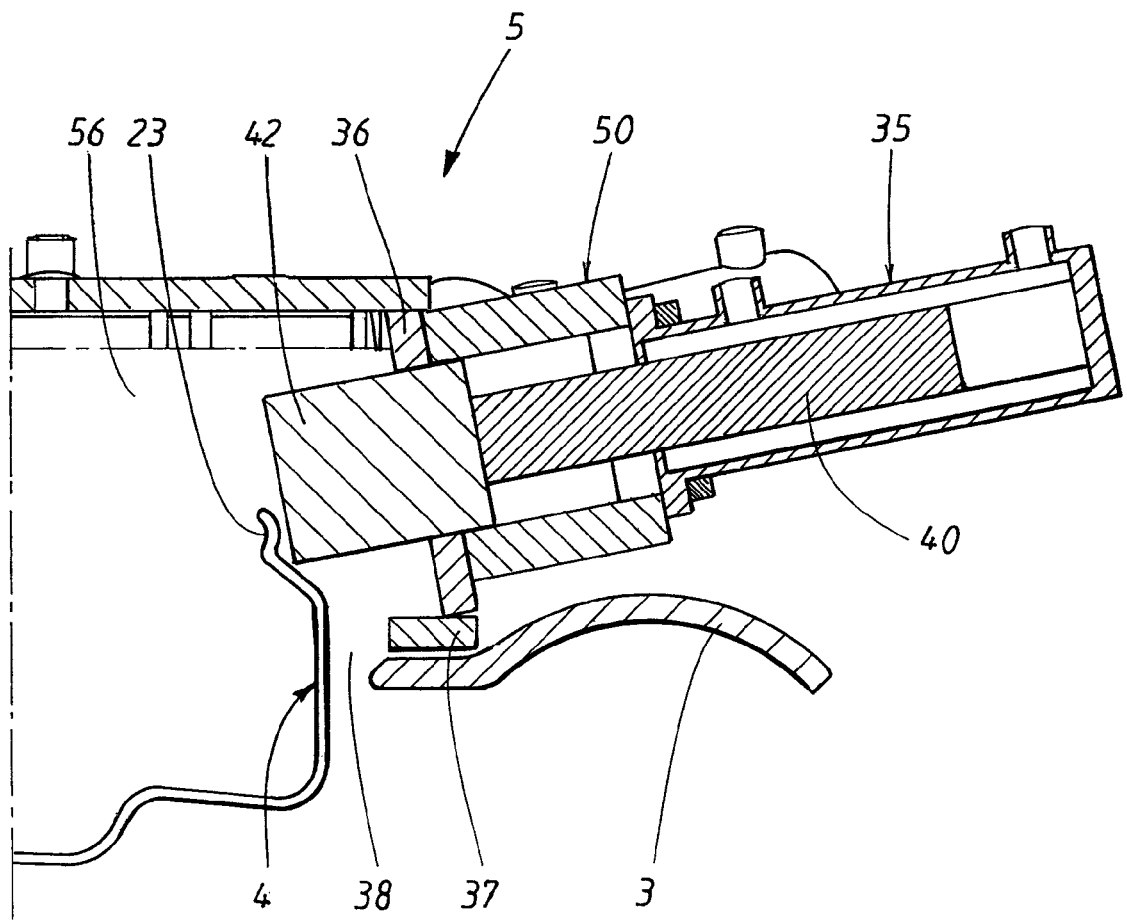
FIG. 8 shows with a section corresponding to FIG. 7 part of a variant of the press-in device in its activated, inner press-in position and also shows schematically, with a part-section, the look of the edge of a separated rim.

For the pressing-in of the rim 4, more precisely its upward-facing rim edge 23, see also FIG. 8, the rim press-in device 5 incorporates a number of, in the shown example eight, press-in elements 24-31, which are movable toward and away from the central axis of symmetry 20 of the device. Each of the press-in elements incorporates a power element 32, in the shown example in the form of a double-acting hydraulic piston cylinder, see FIG. 5-7.

According to the invention, the press-in elements 24-31 are fixed in place in the movable bell 19 and therefore accompany it in its lowering and elevating motion and are arranged in a star shape around said bell, expediently evenly distributed around the 360 degree turn, i.e. in the case of eight elements with an angular interval of 45 degrees. In the example, the press-in elements are directed with their longitudinal axis 33 somewhat inclined relative to the radial plane 34 of the whole of the press-in device 5, such that the press-in elements 24-31 are directed somewhat downward and inward toward the center axis 20. The inclination can advantageously lie within an angular range of 5-30 degrees. The press-in elements 24-31 are fixed in place with the cylinder part 35 of the piston cylinders firmly secured in the movable suspended rig 19 and, more precisely, the securement consists of a number of mounting plates 36 corresponding to the number of press-in elements 24-31, i.e. in the example eight, which are fastened in a ring, jutting down at a slight angle, downward and outward, beneath the top plate 22 along its circumferential edge, which in the example is circular, and are fixed to the top plate by means of welding, for example. Fastened to the bottom side of the mounting plates, by means of welding, for example, is a press-down ring 37, which belongs to the bell and delimits an opening 38 having a diameter which somewhat exceeds the external diameter of the rims 4 and serves as a press-down edge having a downward-facing press-down surface 39. Through lowering of the press-in device 5 from its upper position according to FIG. 1, a tire 3 in a position that is centered relative to the axis of symmetry 20 can hence be compressed into the position shown in FIG. 8, so that the upper rim edge 23 is exposed to pressing-in by means of the press-in elements 24-31, which shall be described in greater detail below. The bell 19 is therefore a carrier or holder, movably suspended from the frame 6, for the press-in elements and thus absorbs the large forces which are generated as the rim is pressed in, without substantially transmitting these to the frame 6. For a certain lateral guidance, the bridge therefore serves as a guide device, for the power device, any side forces upon the press-in device 5 being absorbed.

Each piston cylinder has piston part with piston rod 40, see FIG. 7, which piston part is movable, relative to the cylinder part 35 and in dependence on the applied hydraulic force, linearly along the longitudinal axis 33 in the cylinder part toward and away from the vertical axis of symmetry 20. The hydraulic components are not shown in detail, it should suffice to point out that the piston part separates in a known manner two cylinder chamber parts, which are alternately pressurized by hydraulic fluid for, on the one hand, the motion toward the inside of the bell 19 and, on the other hand, the withdrawing motion outward. All piston cylinders around the bell 19 are each coupled via their connections 73, 74, for connection to a hydraulic system for the alternate pressurization, with the same hydraulic pressure and an equally large volume of hydraulic fluid per unit of time. Attached to the piston rod, at its front end 41, is a press-in or deformation member 42-44, which press-in members, in the shown example, are eight in number, i.e. one for each press-in cylinder, see FIG. 8. The press-in members 42-44 are expediently made of a high-strength steel, expediently in combination with fairly hard metal alloy. The press-in elements are symmetrically positioned and are designed to move symmetrically relative to the rim 4 positioned for pressing-in. This is ensured by the fact that the separating device as a whole is constructed relative to the axis of symmetry 20, which in the shown example is normally a vertical axis. The fed wheel is therefore guaranteed to be positioned substantially symmetrical to the axis of symmetry 20, i.e. lying with its rotational axis substantially coincident with the axis 20.

As can be seen from the figures, the cylinder parts 35 in the shown example are each secured in the mounting plates 36 with their intermediate block 50, which in the example is cylindrical and is expediently welded to the respective mounting plate. The desired inclination of the press-in elements 24-31 is achieved by the inclined securement of the mounting plates between the top plate 22 and the compression ring 37. The cylindrical blocks are intended to form a guide mechanism against side forces and to accommodate the press-in members 42-44, and therefore each have a guideway having a cross-sectional shape tailored to form a guide for the particular press-in member and also the piston rod end. Advantageously, each press-in member is constituted by an upright or substantially vertically extending steel disk of knife-like character, though its front, radially inward facing press-in edge 52 does not need to be sharp or pointed, the essential point being that the press-in member has a severely limited extent as regards the angle of rotation about the axis of symmetry 20, i.e. takes up a smaller part of the graduation interval for the press-in elements, in the example 45 degrees. However, the disk should be sufficiently thick that the generated large forces can be imparted without deformation of the element itself. One example of thickness can be in the order of magnitude of one, possibly a few centimeters. The press-in members therefore have a principal plane which passes through the axis of symmetry 33, along which these press-in members extend. The press-in members 42-44 have such an extent in the vertical direction that they are placed against the rim edge 23 when the whole of the press-in device is in the press-in position and the press-in members are activated, as shown in FIG. 8, which also shows the sectional shape of the deformed rim edge.

Figure 9:
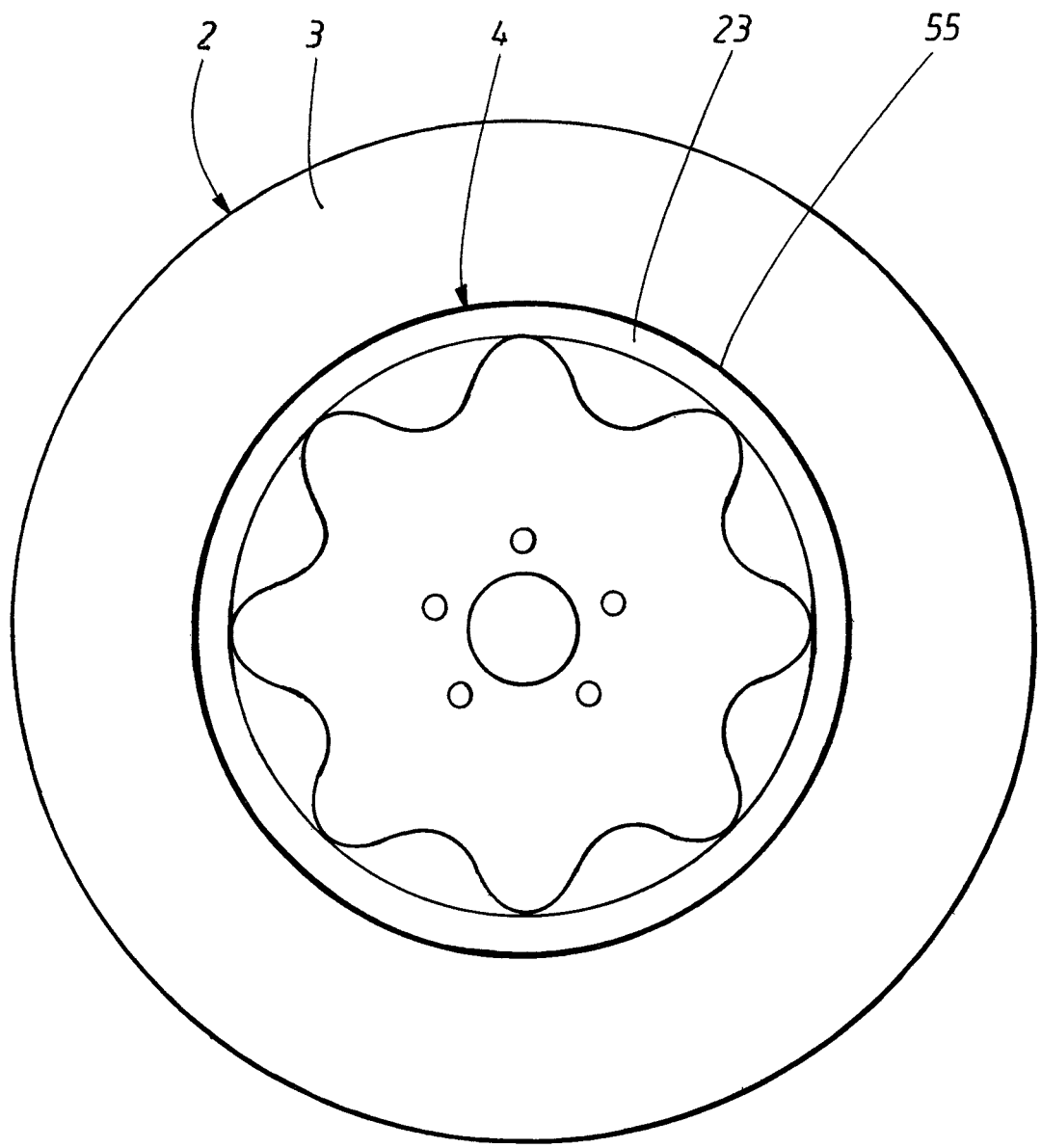

FIG. 9 shows an example of the look of a rim with "shrunken" edge 23, which is folded, and hence the rim edge is pressed in over the whole of its periphery such that it acquires such a transverse dimension or diameter that the rim edge is located inside the tire edge 55. FIG. 9 illustrates this by showing a pressed-in rim 4 placed in a wheel 2 as it looks prior to the press-in operation. In practice, the rim edge can actually in a few places extend outside the tire edge and can still detach itself by virtue of the flexibility of the tire edge. This also applies to the opposite tire edge, which remains in place on the rim at the lower rim edge.

The procedure involved in pressing in the rim edge at the first station can be summarized as follows.

With the wheel positioned according to FIG. 1, the power device 16 is activated, which is made to, with an expansion motion, lower the bridge with the whole of the press-in device 5, together with the rig 19 and the press-in members 24-31, through the expansion of the two piston cylinders by a built-in hydraulic system. The bell 19 is here placed with the press-down surface 39 of the press-down ring 37 against the upper edge portion 55 of the tire, the rig 19 having a substantially cylindrical or polygonal cavity 56 which allows the rim, with its smaller diameter than the opening 38, to slide through the opening a little way into the cavity. One tire edge 55 is hereupon made to leave the associated rim edge 23, which is exposed, as is also the region inside the rim edge, see FIG. 8. Throughout the lowering motion, the press-in elements are held with their press-in members in their withdrawn radially outer position.

With the upper rim edge 23 exposed, the press-in device 5 is activated, which is driven and controlled by a hydraulic system, which produces the press-in motion of the piston cylinders in the forward direction, inward toward the axis of symmetry 20, and also the return motion thereof. Advantageously, all piston cylinders are synchronized and controlled such that, at all times, all eight piston cylinders acquire an equally large volume of hydraulic fluid. The stroke length of the press-in elements, and thus of the plates 42, is precisely chosen such that a predetermined pressing-in of the rim edge is achieved. As a result of the downward and inward inclination of the press-in elements, the motion is likewise directed inward and downward, which gives a better force action upon the rim edge, as will be appreciated from FIG. 8. Here, one of the press-in plates is shown in section in its inner end position and in FIG. 8 it is indicated that all press-in members, including in their inner press-in position, are in the same position, the pressed-in rim edge 23 also being indicated. Once the rim edge has been pressed in, the press-in elements are shifted, the press-in elements being withdrawn radially outward by means of the hydraulic system into a position such that the rim is freed from the press-in elements.

Above, the separating device has been described with the focus on the press-in stage, which is followed by the separation of the rim. In practice, it has proved necessary to complete the separation of the rim from the tire in a separate station in order to ensure that the rim does not get wedged in the tire.

For a step-by-step synchronous feeding of the wheel 2, two synchronously movable shuttle cars 58, 59 are therefore present for feeding one wheel at a time to the first station with the first car and, at the same time, with the second car 59, feeding a wheel with pressed-in rim to a second station 60 for final separation of the rim and the tire. The rim therefore stays in the tire and accompanies it to the second station 60. This has a device 61 for pressing the rim out of the tire and is likewise constructed with a frame 7, which can be of substantially the same portal construction as in the first station 57 with upright side beams, which at least at the top are connected to a horizontal beam construction. The frame supports a vertically working power device 64, corresponding to that in the first station, expediently two piston cylinders each firmly anchored in the frame with their respective cylinder 65. The anchorage, like the anchorage for the power device 16 in the press-in device 5, is arranged high up in the frame.

This second station 60 has a platform 66, which has a hole 75 for passage of the freed rim. The platform 66 can advantageously connect to the first platform 14 and can allow the shuttle car 59 to move a wheel with pressed-in rim on the platform and to be supported by this with the rim centered over the hole. The device 61 for pressing the rim out of the tire 3 is provided with a bridge 67 supported by the power device 64, which bridge is fitted at the lower end of the piston rod, in conformity with the first station. The bridge supports a circular steel plate, to which a number of resilient pressure elements 69 are secured. In the example, these are arranged in a ring and are dimensioned to clamp the tire to the platform 66. Secured to the plate is a cone, which, upon continued activation with the power device 64, presses down the rim, which is pressed in at one edge, through the hole in the platform to a collection point for separated rims, for example in a container. When the shuttle car arrives with the next wheel, the remaining tire on the platform 66 can be pushed aside by the shuttle car to a conveyor (not shown) to a collection point further away, or directly into another container. As in the first station, the function of the power device 64 is to shift the carrier 67 between a set-aside, passive position and an advanced, active position for holding the tire in place and pressing the rim out of the tire. By splitting the rim separation into two stations, productivity is increased, even though it would be possible to carry out the compression of the rim edge and the pressing-out of the rim in the same station.

In summary, the basic structure is therefore that the press-in device 15 is realized as a movably suspended unit, in the form of a carrier 19 for press-in elements for pressing-in of a rim edge, and a downwardly open cavity 56, which is enclosed in the carrier and can receive a part of a rim and has members for pressing down the tire such that the rim edge is exposed. As a result of the movable suspension, the press-in device 15 can be shifted between its set-aside, passive position and its active position, brought up against the wheel, for exposing and pressing in the rim edge by means of the active press-in elements, which, independently of the raising and lowering motion, can be shifted between a set-aside position and an advanced press-in position.

The invention is not limited to the illustrative embodiments described above and shown in the drawings, but can be varied within the scope of the following patent claims. The press-in device can be realized differently. For example, three, four, five, six or more than eight active press-in members can be provided. The device according to the shown embodiment is suitable for both steel rims and aluminum rims. Feed-in and feed-out can be carried out in other ways. The power device 16 which produces the shifting motion of the press-in device as a unit can alternatively be hinge-connected to the frame.

The invention claimed is:

1. A device for automatically separating the tire and the rim in a vehicle wheel and provided with a feed-in device for the feed-in of vehicle wheels comprising:
    a device for exposing one rim edge,
    a press-in device with press-in elements which in an inactive position are located at a distance from said rim edge and are designed to be shifted to an active position in which press-in members are adjusted in the direction of the rim in order to press in said rim edge and a device for setting aside the separated rims to a collection point for rims, and
    a device for feeding out the separated tires to another collection point, the press-in device forming a coherent unit which supports the press-in elements and the unit being movably suspended, by means of a power device, from a frame relative to which the tire is positioned, so that the unit can be shifted between a set-aside, passive position and an active position, brought up to the wheel to be separated, in which one rim edge is exposed, characterized in that the press-in elements can be actively shifted for press-in motion toward the rim edge, in that the unit is realized as a carrier, around which the active press-in elements are firmly fitted in a star-shaped structure, and in that the carrier has members for compressing the tire in order to expose one rim edge.

2. The device as claimed in patent claim 1, wherein the active press-in elements incline for an active shifting motion in the direction inward and downward at an angle relative to a radial plane to an axis of symmetry along which the press-in device is movable between its set-aside and its advanced position.

3. The device as claimed in patent claim 2, wherein the carrier has a cavity around which the press-in elements are arranged, and in that the cavity is open downward toward the wheel to be separated and has an opening with a diameter exceeding the diameter of the rim, surrounded by an, at the bottom, circumferential edge, which forms said compression member for the tire.

4. The device as claimed in patent claim 1, wherein the press-in elements are constituted by piston cylinders, the cylinder part of which, by its inner end, is firmly fitted in the carrier, which carrier forms a rig, the piston rod part supporting at its inner end press-in members designed to press in one rim edge when activated.

5. The device as claimed in patent claim 1, further including:
a device for, after a rim edge has been pressed in in a substantially radial direction, pressing the rim out of the tire in the axial direction.

6. The device as claimed in patent claim 5, further including:
a second station for, in a separate step, pressing the rim out of the tire.

7. The device as claimed in patent claim 6, wherein the device for pressing the rim out of the tire is constituted by a power element for shifting a device between a passive, set-aside position and an active, advanced position for holding the tire in place and pressing out the rim.

8. The device as claimed in patent claim 7, wherein the tire is held in place by means of elastically resilient pressure elements, and in that the rim is designed to be pressed out by a clamping cone situated inside these.

9. The device as claimed in patent claim 8, wherein the elastic pressure elements and the clamping cone are supported by the power element which can be shifted between the set-aside position and the advanced position.

* * * * *